(12) United States Patent
Graham et al.

(10) Patent No.: US 11,625,393 B2
(45) Date of Patent: Apr. 11, 2023

(54) HIGH PERFORMANCE COMPUTING SYSTEM

(71) Applicant: MELLANOX TECHNOLOGIES TLV LTD., Raanana (IL)

(72) Inventors: Richard Graham, Knoxville, TN (US); Lion Levi, Yavne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/782,118

(22) Filed: Feb. 5, 2020

(65) Prior Publication Data

US 2020/0265043 A1    Aug. 20, 2020

Related U.S. Application Data

(60) Provisional application No. 62/807,266, filed on Feb. 19, 2019.

(51) Int. Cl.
| | | |
|---|---|---|
| *G06F 16/242* | (2019.01) | |
| *G06F 16/21* | (2019.01) | |
| *G06F 16/22* | (2019.01) | |
| *G06F 16/11* | (2019.01) | |

(52) U.S. Cl.
CPC .......... *G06F 16/244* (2019.01); *G06F 16/214* (2019.01); *G06F 16/2237* (2019.01); *G06F 16/2246* (2019.01)

(58) Field of Classification Search
CPC .. G06F 16/244; G06F 16/2237; G06F 16/214; G06F 16/2246
USPC .......................................................... 707/696
See application file for complete search history.

(56) References Cited

U.S. PATENT DOCUMENTS

| | | | |
|---|---|---|---|
| 4,933,969 A | 6/1990 | Marshall et al. | |
| 5,068,877 A | 11/1991 | Near et al. | |
| 5,325,500 A | 6/1994 | Bell et al. | |
| 5,353,412 A | 10/1994 | Douglas et al. | |
| 5,404,565 A * | 4/1995 | Gould ............... | G06F 15/17381 370/406 |
| 5,606,703 A | 2/1997 | Brady et al. | |
| 5,944,779 A | 8/1999 | Blum | |
| 6,041,049 A | 3/2000 | Brady | |

(Continued)

OTHER PUBLICATIONS

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

(Continued)

*Primary Examiner* — Kuen S Lu
(74) *Attorney, Agent, or Firm* — Kligler & Associates Patent Attorneys Ltd

(57) ABSTRACT

A method including providing a SHARP tree including a plurality of data receiving processes and at least one aggregation node, designating a data movement command, providing a plurality of data input vectors to each of the plurality of data receiving processes, respectively, the plurality of data receiving processes each passing on the respective received data input vector to the at least one aggregation node, and the at least one aggregation node carrying out the data movement command on the received plurality of data input vectors. Related apparatus and methods are also provided.

12 Claims, 4 Drawing Sheets

(56) References Cited

U.S. PATENT DOCUMENTS

| | | | |
|---|---|---|---|
| 6,370,502 B1* | 4/2002 | Wu | G10L 19/028 |
| | | | 704/E19.02 |
| 6,483,804 B1 | 11/2002 | Muller et al. | |
| 6,507,562 B1* | 1/2003 | Kadansky | H04L 12/1877 |
| | | | 370/254 |
| 6,728,862 B1 | 4/2004 | Wilson | |
| 6,857,004 B1 | 2/2005 | Howard et al. | |
| 6,937,576 B1 | 8/2005 | Di Benedetto et al. | |
| 7,102,998 B1 | 9/2006 | Golestani | |
| 7,124,180 B1 | 10/2006 | Ranous | |
| 7,164,422 B1 | 1/2007 | Wholey, III et al. | |
| 7,171,484 B1 | 1/2007 | Krause et al. | |
| 7,313,582 B2 | 12/2007 | Bhanot et al. | |
| 7,327,693 B1 | 2/2008 | Rivers et al. | |
| 7,336,646 B2 | 2/2008 | Muller | |
| 7,346,698 B2 | 3/2008 | Hannaway | |
| 7,555,549 B1 | 6/2009 | Campbell et al. | |
| 7,613,774 B1 | 11/2009 | Caronni et al. | |
| 7,636,424 B1 | 12/2009 | Halikhedkar et al. | |
| 7,636,699 B2 | 12/2009 | Stanfill | |
| 7,738,443 B2 | 6/2010 | Kumar | |
| 8,213,315 B2 | 7/2012 | Crupnicoff et al. | |
| 8,380,880 B2 | 2/2013 | Gulley et al. | |
| 8,510,366 B1 | 8/2013 | Anderson et al. | |
| 8,738,891 B1* | 5/2014 | Karandikar | G06F 3/14 |
| | | | 712/3 |
| 8,761,189 B2 | 6/2014 | Shachar et al. | |
| 8,768,898 B1 | 7/2014 | Trimmer et al. | |
| 8,775,698 B2 | 7/2014 | Archer et al. | |
| 8,811,417 B2 | 8/2014 | Bloch et al. | |
| 9,110,860 B2 | 8/2015 | Shahar | |
| 9,189,447 B2 | 11/2015 | Faraj | |
| 9,294,551 B1 | 3/2016 | Froese et al. | |
| 9,344,490 B2 | 5/2016 | Bloch et al. | |
| 9,563,426 B1 | 2/2017 | Bent et al. | |
| 9,626,329 B2 | 4/2017 | Howard | |
| 9,756,154 B1 | 9/2017 | Jiang | |
| 10,015,106 B1 | 7/2018 | Florissi et al. | |
| 10,158,702 B2 | 12/2018 | Bloch et al. | |
| 10,284,383 B2 | 5/2019 | Bloch et al. | |
| 10,296,351 B1 | 5/2019 | Kohn et al. | |
| 10,305,980 B1 | 5/2019 | Gonzalez et al. | |
| 10,318,306 B1 | 6/2019 | Kohn et al. | |
| 10,425,350 B1 | 9/2019 | Florissi | |
| 10,521,283 B2 | 12/2019 | Shuler et al. | |
| 10,541,938 B1 | 1/2020 | Timmerman et al. | |
| 10,621,489 B2 | 4/2020 | Appuswamy et al. | |
| 2002/0010844 A1 | 1/2002 | Noel et al. | |
| 2002/0035625 A1* | 3/2002 | Tanaka | H04L 41/0859 |
| | | | 703/13 |
| 2002/0150094 A1 | 10/2002 | Cheng et al. | |
| 2002/0150106 A1 | 10/2002 | Kagan et al. | |
| 2002/0152315 A1 | 10/2002 | Kagan et al. | |
| 2002/0152327 A1 | 10/2002 | Kagan et al. | |
| 2002/0152328 A1 | 10/2002 | Kagan et al. | |
| 2003/0018828 A1 | 1/2003 | Craddock et al. | |
| 2003/0061417 A1 | 3/2003 | Craddock et al. | |
| 2003/0065856 A1 | 4/2003 | Kagan et al. | |
| 2004/0062258 A1 | 4/2004 | Grow et al. | |
| 2004/0078493 A1 | 4/2004 | Blumrich et al. | |
| 2004/0120331 A1 | 6/2004 | Rhine et al. | |
| 2004/0123071 A1 | 6/2004 | Stefan et al. | |
| 2004/0252685 A1 | 12/2004 | Kagan et al. | |
| 2004/0260683 A1* | 12/2004 | Chan | G06F 16/9027 |
| 2005/0097300 A1 | 5/2005 | Gildea et al. | |
| 2005/0122329 A1 | 6/2005 | Janus | |
| 2005/0129039 A1 | 6/2005 | Biran et al. | |
| 2005/0131865 A1 | 6/2005 | Jones et al. | |
| 2005/0281287 A1 | 12/2005 | Ninomi et al. | |
| 2006/0282838 A1 | 12/2006 | Gupta et al. | |
| 2007/0127396 A1 | 6/2007 | Jain et al. | |
| 2007/0162236 A1* | 7/2007 | Lamblin | H03M 7/3082 |
| | | | 708/235 |
| 2008/0104218 A1 | 5/2008 | Liang et al. | |
| 2008/0126564 A1 | 5/2008 | Wilkinson | |
| 2008/0168471 A1 | 7/2008 | Benner et al. | |
| 2008/0181260 A1 | 7/2008 | Vonog et al. | |
| 2008/0192750 A1 | 8/2008 | Ko et al. | |
| 2008/0244220 A1 | 10/2008 | Lin et al. | |
| 2008/0263329 A1 | 10/2008 | Archer et al. | |
| 2008/0288949 A1 | 11/2008 | Bohra et al. | |
| 2008/0298380 A1 | 12/2008 | Rittmeyer et al. | |
| 2008/0307082 A1 | 12/2008 | Cai et al. | |
| 2009/0037377 A1 | 2/2009 | Archer et al. | |
| 2009/0063816 A1 | 3/2009 | Arimilli et al. | |
| 2009/0063817 A1 | 3/2009 | Arimilli et al. | |
| 2009/0063891 A1 | 3/2009 | Arimilli et al. | |
| 2009/0182814 A1 | 7/2009 | Tapolcai et al. | |
| 2009/0247241 A1 | 10/2009 | Gollnick et al. | |
| 2009/0292905 A1 | 11/2009 | Faraj | |
| 2010/0017420 A1 | 1/2010 | Archer et al. | |
| 2010/0049836 A1 | 2/2010 | Kramer | |
| 2010/0074098 A1 | 3/2010 | Zeng et al. | |
| 2010/0095086 A1 | 4/2010 | Eichenberger et al. | |
| 2010/0185719 A1 | 7/2010 | Howard | |
| 2010/0241828 A1 | 9/2010 | Yu et al. | |
| 2011/0060891 A1 | 3/2011 | Jia | |
| 2011/0066649 A1 | 3/2011 | Berlyant et al. | |
| 2011/0093258 A1* | 4/2011 | Xu | G06F 40/237 |
| | | | 704/9 |
| 2011/0119673 A1 | 5/2011 | Bloch et al. | |
| 2011/0173413 A1 | 7/2011 | Chen et al. | |
| 2011/0219208 A1 | 9/2011 | Asaad | |
| 2011/0238956 A1 | 9/2011 | Arimilli et al. | |
| 2011/0258245 A1 | 10/2011 | Blocksome et al. | |
| 2011/0276789 A1 | 11/2011 | Chambers et al. | |
| 2012/0063436 A1 | 3/2012 | Thubert et al. | |
| 2012/0117331 A1 | 5/2012 | Krause et al. | |
| 2012/0131309 A1 | 5/2012 | Johnson | |
| 2012/0216021 A1 | 8/2012 | Archer et al. | |
| 2012/0254110 A1 | 10/2012 | Takemoto | |
| 2013/0117548 A1 | 5/2013 | Grover et al. | |
| 2013/0159410 A1 | 6/2013 | Lee et al. | |
| 2013/0318525 A1 | 11/2013 | Palanisamy et al. | |
| 2013/0336292 A1 | 12/2013 | Kore et al. | |
| 2014/0019574 A1 | 1/2014 | Cardona et al. | |
| 2014/0033217 A1* | 1/2014 | Vajda | G06F 9/524 |
| | | | 718/102 |
| 2014/0047341 A1 | 2/2014 | Breternitz et al. | |
| 2014/0095779 A1 | 4/2014 | Forsyth et al. | |
| 2014/0122831 A1 | 5/2014 | Uliel et al. | |
| 2014/0189308 A1 | 7/2014 | Hughes et al. | |
| 2014/0211804 A1 | 7/2014 | Makikeni et al. | |
| 2014/0258438 A1 | 9/2014 | Ayoub | |
| 2014/0280420 A1 | 9/2014 | Khan | |
| 2014/0281370 A1 | 9/2014 | Khan | |
| 2014/0362692 A1 | 12/2014 | Wu et al. | |
| 2014/0365548 A1 | 12/2014 | Mortensen | |
| 2015/0106578 A1 | 4/2015 | Warfield et al. | |
| 2015/0143076 A1 | 5/2015 | Khan | |
| 2015/0143077 A1 | 5/2015 | Khan | |
| 2015/0143078 A1 | 5/2015 | Khan et al. | |
| 2015/0143079 A1 | 5/2015 | Khan | |
| 2015/0143085 A1 | 5/2015 | Khan | |
| 2015/0143086 A1 | 5/2015 | Khan | |
| 2015/0154058 A1 | 6/2015 | Miwa et al. | |
| 2015/0178211 A1* | 6/2015 | Hiramoto | G06F 12/0806 |
| | | | 711/143 |
| 2015/0180785 A1 | 6/2015 | Annamraju | |
| 2015/0188987 A1 | 7/2015 | Reed et al. | |
| 2015/0193271 A1 | 7/2015 | Archer et al. | |
| 2015/0212972 A1 | 7/2015 | Boettcher et al. | |
| 2015/0269116 A1 | 9/2015 | Raikin et al. | |
| 2015/0278347 A1* | 10/2015 | Meyer | G06F 16/24556 |
| | | | 707/714 |
| 2015/0365494 A1 | 12/2015 | Cardona et al. | |
| 2015/0379022 A1 | 12/2015 | Puig et al. | |
| 2016/0055225 A1 | 2/2016 | Xu et al. | |
| 2016/0092362 A1 | 3/2016 | Barron et al. | |
| 2016/0105494 A1 | 4/2016 | Reed et al. | |
| 2016/0112531 A1 | 4/2016 | Milton et al. | |
| 2016/0117277 A1 | 4/2016 | Raindel et al. | |

(56) References Cited

U.S. PATENT DOCUMENTS

| | | | |
|---|---|---|---|
| 2016/0179537 A1* | 6/2016 | Kunzman | G06F 9/30036 712/7 |
| 2016/0219009 A1 | 7/2016 | French | |
| 2016/0248656 A1 | 8/2016 | Anand et al. | |
| 2016/0299872 A1 | 10/2016 | Vaidyanathan et al. | |
| 2016/0342568 A1 | 11/2016 | Burchard et al. | |
| 2016/0352598 A1 | 12/2016 | Reinhardt et al. | |
| 2016/0364350 A1 | 12/2016 | Sanghi et al. | |
| 2017/0063613 A1* | 3/2017 | Bloch | H04L 12/185 |
| 2017/0093715 A1 | 3/2017 | McGhee et al. | |
| 2017/0116154 A1 | 4/2017 | Palmer et al. | |
| 2017/0187496 A1 | 6/2017 | Shalev et al. | |
| 2017/0187589 A1 | 6/2017 | Pope et al. | |
| 2017/0187629 A1 | 6/2017 | Shalev et al. | |
| 2017/0187846 A1 | 6/2017 | Shalev et al. | |
| 2017/0199844 A1 | 7/2017 | Burchard et al. | |
| 2017/0262517 A1* | 9/2017 | Horowitz | G06F 16/254 |
| 2017/0344589 A1* | 11/2017 | Kafai | G06F 16/2237 |
| 2018/0004530 A1 | 1/2018 | Vorbach | |
| 2018/0046901 A1 | 2/2018 | Xie et al. | |
| 2018/0047099 A1 | 2/2018 | Bonig et al. | |
| 2018/0089278 A1 | 3/2018 | Bhattacharjee et al. | |
| 2018/0091442 A1 | 3/2018 | Chen et al. | |
| 2018/0097721 A1 | 4/2018 | Matsui et al. | |
| 2018/0173673 A1 | 6/2018 | Daglis et al. | |
| 2018/0262551 A1 | 9/2018 | Demeyer et al. | |
| 2018/0285316 A1 | 10/2018 | Thorson et al. | |
| 2018/0287928 A1 | 10/2018 | Levi et al. | |
| 2018/0302324 A1 | 10/2018 | Kasuya | |
| 2018/0321912 A1 | 11/2018 | Li et al. | |
| 2018/0321938 A1 | 11/2018 | Boswell et al. | |
| 2018/0349212 A1 | 12/2018 | Liu et al. | |
| 2018/0367465 A1 | 12/2018 | Levi | |
| 2018/0375781 A1 | 12/2018 | Chen et al. | |
| 2019/0018805 A1 | 1/2019 | Benisty | |
| 2019/0026250 A1 | 1/2019 | Das Sarma et al. | |
| 2019/0044889 A1 | 2/2019 | Serres et al. | |
| 2019/0065208 A1 | 2/2019 | Liu et al. | |
| 2019/0068501 A1 | 2/2019 | Schneider et al. | |
| 2019/0102179 A1 | 4/2019 | Fleming et al. | |
| 2019/0102338 A1 | 4/2019 | Tang et al. | |
| 2019/0102640 A1 | 4/2019 | Balasubramanian | |
| 2019/0114533 A1 | 4/2019 | Ng et al. | |
| 2019/0121388 A1 | 4/2019 | Knowles et al. | |
| 2019/0138638 A1 | 5/2019 | Pal et al. | |
| 2019/0147092 A1 | 5/2019 | Pal et al. | |
| 2019/0149488 A1 | 5/2019 | Bansal et al. | |
| 2019/0171612 A1 | 6/2019 | Shahar et al. | |
| 2019/0235866 A1 | 8/2019 | Das Sarma et al. | |
| 2019/0303168 A1 | 10/2019 | Fleming, Jr. et al. | |
| 2019/0303263 A1 | 10/2019 | Fleming, Jr. et al. | |
| 2019/0324431 A1 | 10/2019 | Cella et al. | |
| 2019/0339688 A1 | 11/2019 | Cella et al. | |
| 2019/0347099 A1 | 11/2019 | Eapen et al. | |
| 2019/0369994 A1 | 12/2019 | Parandeh Afshar et al. | |
| 2019/0377580 A1 | 12/2019 | Vorbach | |
| 2019/0379714 A1 | 12/2019 | Levi et al. | |
| 2020/0005859 A1 | 1/2020 | Chen et al. | |
| 2020/0034145 A1 | 1/2020 | Bainville et al. | |
| 2020/0057748 A1 | 2/2020 | Danilak | |
| 2020/0103894 A1 | 4/2020 | Cella et al. | |
| 2020/0106828 A1 | 4/2020 | Elias et al. | |
| 2020/0137013 A1 | 4/2020 | Jin et al. | |
| 2021/0203621 A1 | 7/2021 | Ylisirnio et al. | |

OTHER PUBLICATIONS

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

U.S. Appl. No. 16/357,356 office action dated May 14, 2020.

European Application # 20156490.3 search report dated Jun. 25, 2020.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Gainaru et al., "Using InfiniBand Hardware Gather-Scatter Capabilities to Optimize MPI All-to-All", Proceedings of the 23rd European MPI Users' Group Meeting, pp. 167-179, Sep. 2016.

Pjesivac-Grbovic et al., "Performance Analysis of MPI Collective Operations", 19th IEEE International Parallel and Distributed Processing Symposium, pp. 1-19, 2015.

Mellanox Technologies, "InfiniScale IV: 36-port 40GB/s Infiniband Switch Device", pp. 1-2, year 2009.

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802.1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (Hotl'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

Infiniband Trade Association, "InfiniBand™ Architecture Specification", release 1.2.1, pp. 1-1727, Jan. 2008.

InfiniBand Architecture Specification, vol. 1, Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

Ben-Moshe et al., U.S. Appl. No. 16/750,019, filed Jan. 23, 2020.

(56) References Cited

OTHER PUBLICATIONS

Chapman et al., "Introducing OpenSHMEM: SHMEM for the PGAS Community," Proceedings of the Forth Conferene on Partitioned Global Address Space Programming Model, pp. 1-4, Oct. 2010.
Priest et al., "You've Got Mail (YGM): Building Missing Asynchronous Communication Primitives", IEEE International Parallel and Distributed Processing Symposium Workshops, pp. 221-230, year 2019.
Wikipedia, "Nagle's algorithm", pp. 1-4, Dec. 12, 2019.
U.S. Appl. No. 16/430,457 Office Action dated Jul. 9, 2021.
Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.
EP Application # 20216972 Search Report dated Jun. 11, 2021.
U.S. Appl. No. 16/789,458 Office Action dated Jun. 10, 2021.
U.S. Appl. No. 16/750,019 Office Action dated Jun. 15, 2021.
U.S. Appl. No. 17/147,487 Office Action dated Jun. 30, 2022.
U.S. Appl. No. 17/147,487 Office Action dated Nov. 29, 2022.
U.S. Appl. No. 17/495,824 Office Action dated Jan. 27, 2023.

\* cited by examiner

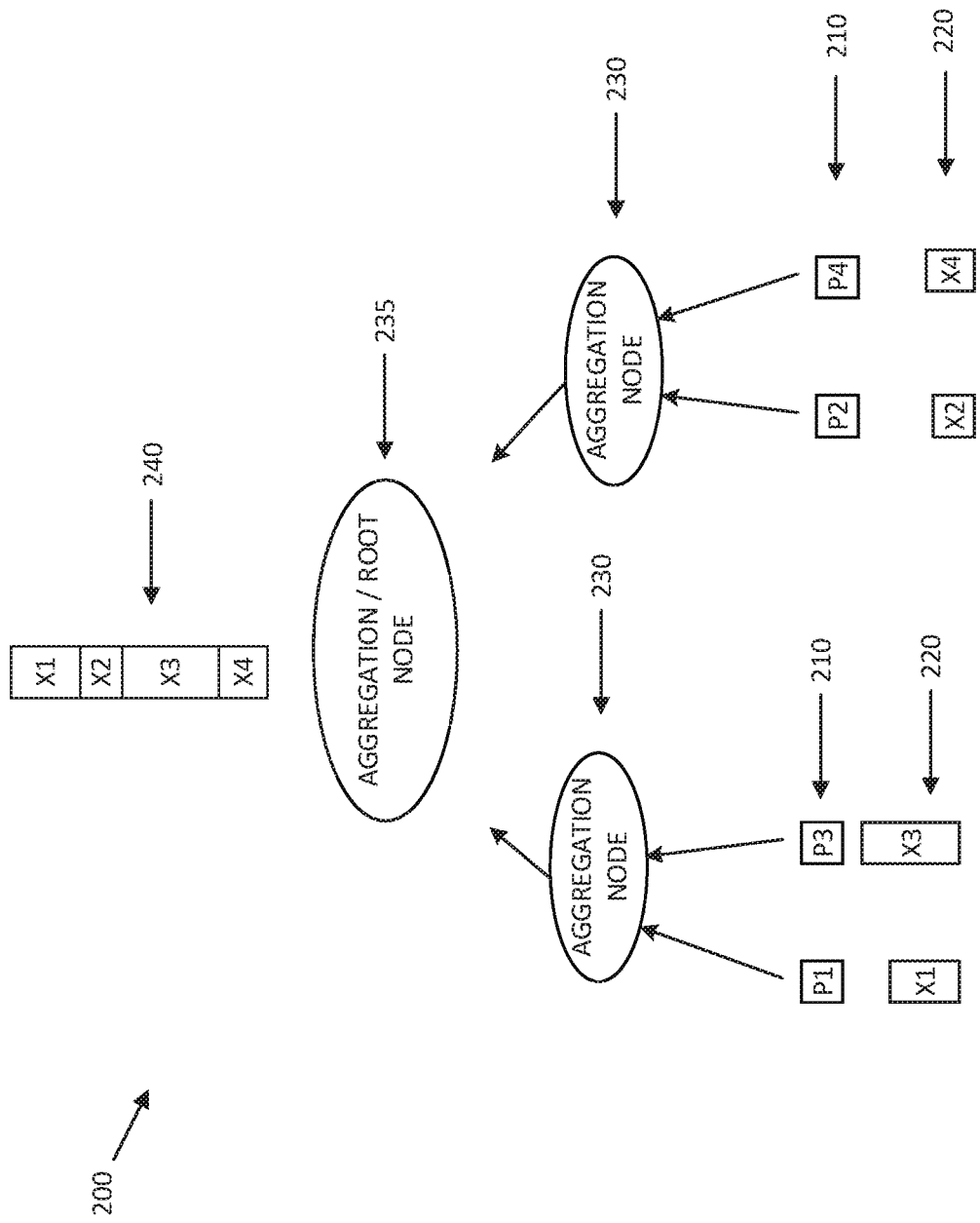

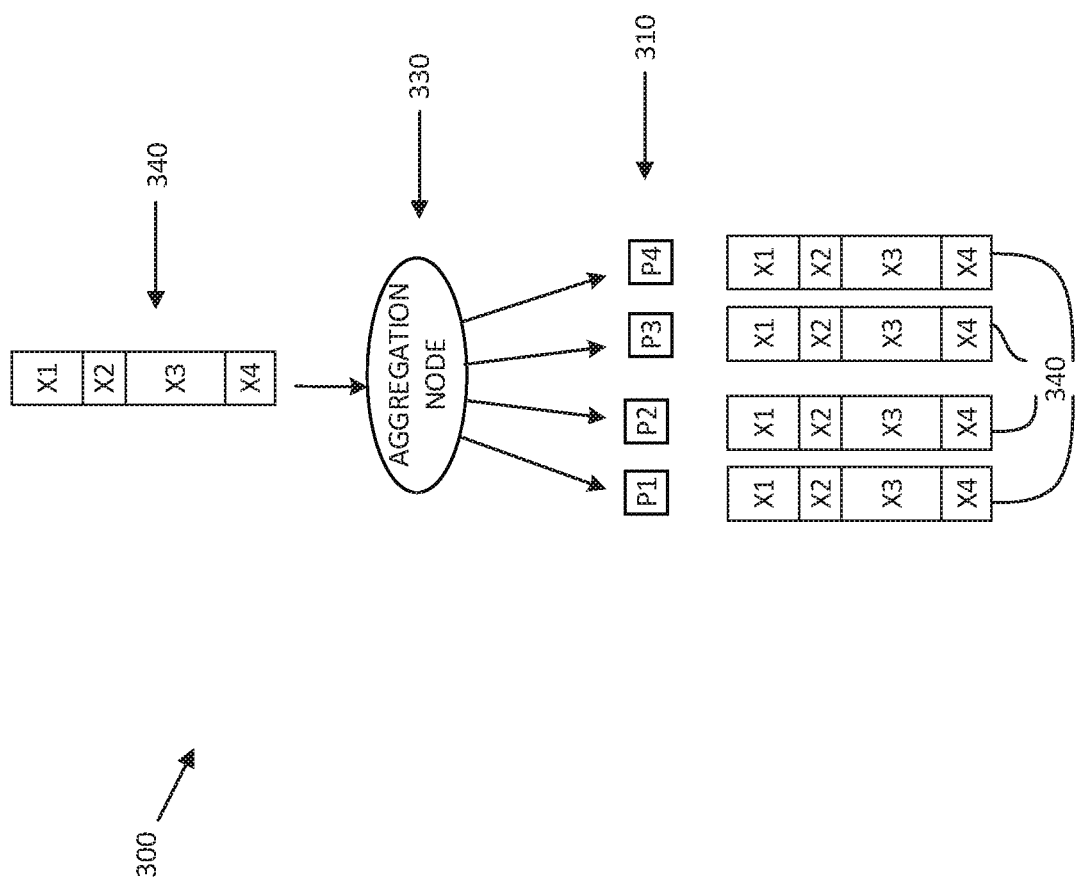

under the control of the SHARP algorithm.

HIGH PERFORMANCE COMPUTING SYSTEM

PRIORITY CLAIM

The present application claims priority from U.S. Provisional Patent Application Ser. 62/807,266 of Levi et al, filed 19 Feb. 2019.

FIELD OF THE INVENTION

The present invention relates to high performance computing systems in general.

BACKGROUND OF THE INVENTION

In high performance computing (HPC) systems many applications are written in a manner that requires communication between the systems which perform portions of the work (termed herein "processes").

Part of the communications includes collective operation such as (by way of non-limiting example) doing sum of multiple vectors (element-wise add operation) from multiple processes, one per process, and sending a copy of the resulting vector to all the participating processes; this operation is called "all-reduce". Another non-limiting example would be sending the result to only one of the processes; this operation is called "reduce".

In addition to the compute elements (that is, reduce and all-reduce involve mathematical operators) there are data movement commands such as (by way of non-limiting example) all2all, gather, all gather, gather v, all gather v, scatter, etc. Commands of this type are defined in the well-known Message Passing Interface specification, and other communication Application Programmer Interface definitions.

SUMMARY OF THE INVENTION

The present invention, in certain embodiments thereof, seeks to provide an improved system and method for high performance computing.

There is thus provided in accordance with an exemplary embodiment of the present invention a method including providing a SHARP tree including a plurality of data receiving processes and at least one aggregation node, designating a data movement command, providing a plurality of data input vectors to each of the plurality of data receiving processes, respectively, the plurality of data receiving processes each passing on the respective received data input vector to the at least one aggregation node, and the at least one aggregation node carrying out the data movement command on the received plurality of data input vectors.

Further in accordance with an exemplary embodiment of the present invention the data movement command includes one of the following: gather, all gather, gather v, and all gather v.

Still further in accordance with an exemplary embodiment of the present invention the at least one aggregation node produces an output vector.

Additionally in accordance with an exemplary embodiment of the present invention at least one of the plurality of data input vectors includes a sparse vector.

Moreover in accordance with an exemplary embodiment of the present invention the at least one aggregation node utilizes a SHARP protocol.

There is also provided in accordance with another exemplary embodiment of the present invention apparatus including a SHARP tree including a plurality of data receiving processes and at least one aggregation node, the SHARP tree being configured to perform the following: receiving a data movement command, receiving a plurality of data input vectors to each of the plurality of data receiving processes, respectively, the data receiving processes each passing on the respective received data input vector to the at least one aggregation node, and the at least one aggregation node carrying out the data movement command on the received plurality of data input vectors.

Further in accordance with an exemplary embodiment of the present invention the data movement command includes one of the following: gather, all gather, gather v, and all gather v.

Still further in accordance with an exemplary embodiment of the present invention the at least one aggregation node is configured to produce an output vector.

Additionally in accordance with an exemplary embodiment of the present invention at least one of the plurality of data input vectors includes a sparse vector.

Moreover in accordance with an exemplary embodiment of the present invention the at least one aggregation node utilizes a SHARP protocol.

BRIEF DESCRIPTION OF THE DRAWINGS

The present invention will be understood and appreciated more fully from the following detailed description, taken in conjunction with the drawings in which:

FIG. 2 is a simplified pictorial illustration of a high-performance computing system constructed and operative in accordance with an alternative exemplary embodiment of the present invention;

FIG. 3A is a simplified pictorial illustration showing distribution of data, in a system similar to that of FIG. 1, to all processes.

DETAILED DESCRIPTION OF AN EMBODIMENT

General Introduction

Figure 1:
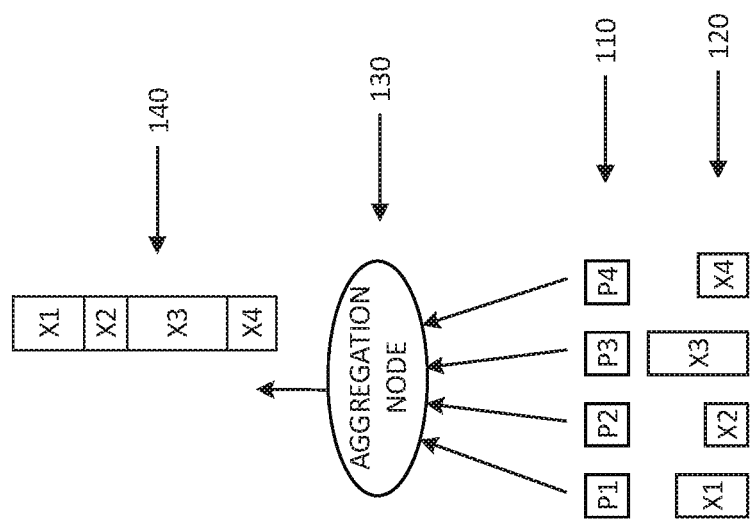
FIG. 1 is a simplified pictorial illustration of a high-performance computing system constructed and operative in accordance with an exemplary embodiment of the present invention.

By way of introduction (but without limiting the generality of the present application), the concept behind exemplary embodiments of the present invention is to use the SHARP protocol to accelerate (at least the operations) gather, all gather, gather V, and all gather V.

The SHARP algorithm/protocol is described in US Published Patent Application 2017/0063613 of Bloch et al, the disclosure of which is hereby incorporated herein by reference.

In certain exemplary embodiments of the present invention, computations which may be described herein as if they occur in a serial manner may be executed in such a way that computations already occur while data is still being received.

The inventors of the present invention believe that current methodology for addressing the above-mentioned scenarios is to use software algorithms in order to perform the operations mentioned above. The software algorithms involve a large amount of data transfer/movement. Significant overhead may also be generated on a CPU which manages the algorithms, since multiple packets, each with a small amount of data, are sent; sometimes identical such packets are sent multiple times to multiple destinations, creating additional packet/bandwidth overhead, including header overhead. In addition, such software algorithms may create large latency when a large number of processes are involved.

In exemplary embodiments of the present invention, one goal is to offload work from the management CPU/s by simplification of the process using the SHARP algorithm/protocol (referred to above and described in US Published Patent Application 2017/0063613 of Bloch et al, the disclosure of which has been incorporated herein by reference); latency as well as bandwidth consumption may also be reduced in such exemplary embodiments.

Embodiment Description

In exemplary embodiments of the present invention, the SHARP algorithm/protocol (referred to above) is used to implement at least: gather; gather v; all gather; and all gather v.

In general, in exemplary embodiments of the present invention, the gather operation is treated as a regular reduction operation by using a new data format supporting sparse representation. When using the sparse representation each process/aggregation point sends its data to the SHARP network, while allowing the aggregation to move forward; this is different from a regular aggregation operation which assumes that each one of the processes/aggregation points contribute the exact same vector size.

It is appreciated that, in certain exemplary embodiments, within the SHARP network, a sparse representation may be converted to a dense representation; in certain cases, a dense representation may be able to be processed with greater efficiency. It is also appreciated that, in such a case, both sparse and dense representations may co-exist simultaneously in different points within the SHARP network.

In exemplary embodiments of the present invention, the following protocol updates are made relative to the SHARP protocol (see US Published Patent Application 2017/0063613 of Bloch et al, the disclosure of which has been incorporated herein by reference):

The SHARP operation header carries an indication the SHARP payload is sparse

The SHARP operation header uses a "sum" operation to eliminate the need to create a new operation The following is one possible non-limiting example of an appropriate data format useable in exemplary embodiments of the present invention:

Index data size in bytes data [ ] data [ ] represents a list of data elements, each of which can be byte/s or bit/s. A special index value is reserved to mark the end of the data.

In exemplary embodiments, the following is an example of SHARP protocol behavior for using sparse data: An aggregation point looks at the data that arrives. If there is a matching index the aggregation point will implement the operation that is mentioned in the operation header; as a consequence of the matching index, the aggregation point will add the single index data to the result vector (that is, will concatenate the single data to the result vector).

The following, in exemplary embodiments, are non-limiting implementations of various operations:
1. How to implement gather:
Each process sends its data with index=rank_id, data_size=data size contributed, the result vector will include data from all the processes because each index will be unique and aggregation nodes will concatenate all the received data.
In gather, each process sends data, and that data is (in the end of the gather) held by a single process.
2. How to implement all-gather:
Similar to gather but ask SHARP protocol to send the result to all the processes that contributed to this operation. In all-gather, each process sends data, and that data is sent to all other processes.
3. How to implement gather v:
Each process sends a variant data size, indicating the amount of data that it sent; the SHARP protocol generates a result that includes all the data with variant size. A rank id, identifying the sending process, may also be sent.
The addition of "v" indicates that each process may send a vector of any size which that process wishes to send; otherwise, gather v is similar to gather.
4. How to implement all-gather v:
Similar to gather v but ask SHARP protocol to send the result to all the processes that contributed to this operation. Similarly to gather v, in certain exemplary embodiments the amount of data that is sent, and/or a rank id, may be provide by processes which send data, although it is appreciated that including such information is generally optional
The addition of "v" indicates that each process may send a vector of any size which that process wishes to send; otherwise, all-gather v is similar to all-gather.

As indicated above, the data format is exemplary only, and is in no way meant to be limiting. Without limiting the generality of the foregoing, it is appreciated that certain optimizations, including compression of meta-data (index and data size), may be used.

In exemplary embodiments, the present invention utilizes the SHARP protocol all-reduce ability in which processes send data for reduction. However, the all gather operation differs from previously-used examples of the SHARP protocol all-reduce: in all-reduce each process sends a vector of size X and the result is also of size X (an element-wise operation is performed). In all gather or all gather v, each process j sends vector of size Xj where the result vector size is Sum(Xj). In order to support this operation, each process to sends its own data Xj and all of the data is gathered into a single large vector. Persons skilled in the art will appreciate how the same principles apply to the other operations described herein.

Reference is now made to FIG. 1, which is a simplified pictorial illustration of a high-performance computing system, generally designated 100, constructed and operative in accordance with an exemplary embodiment of the present invention. FIG. 1, by way of non-limiting example, depicts a particularly small system including only 4 processes 110; it is appreciated that, in general, a much larger number of processes would be used.

In FIG. 1, each of the 4 processes 110 (designated P1, P2, P3, and P4) is depicted as sending vectors 120 (designated X1, X2, X3, and X4; corresponding respectively to P1, P2, P3, and P4), the vectors 120 being various sizes, for an operation to be carried out. An aggregation node 130 gathers all of the data received (the vectors 120, X1, X2, X3, and X4) from the 4 processes 110 (P1, P2, P3, and P4) into a single vector 140.

Assuming, as described above, that the sparse vector format includes indexes, the aggregation node will be able to generate an ordered vector as depicted in FIG. 1. In general, if (by way of non-limiting example), indexes range from 0-100, the resulting sorted vector may be sorted in order of the indexes. This feature would allow finding data relating to a given index more easily.

The aggregation operation will be carried out (in a manner more complex than that shown for purposes of simplicity of illustration in FIG. 1) on multi-level aggregation, as is usual in SHARP (see US Published Patent Application 2017/0063613 of Bloch et al, the disclosure of which has been incorporated herein by reference), thus achieving scalability and hierarchical operation.

In the general case the aggregation node will not assume the indexes are consecutive. For example, in the particular non-limiting example of FIG. 1, not all vectors 120 need be present.

Reference is now made to FIG. 2, which is a simplified pictorial illustration of a high-performance computing system constructed and operative in accordance with an alternative exemplary embodiment of the present invention. The system of FIG. 2, generally designated 200, operates similarly to the system of FIG. 1, with a plurality of processes 210 sending vectors 220 towards aggregation nodes 230. In the system of FIG. 2, two different aggregation nodes 230 are shown as receiving the vectors 220 from the processes 210; this type of architecture allows better scaling. It will be appreciated that, while only two aggregation nodes 230 are shown, in practice a much larger number of aggregation nodes, arranged in a tree structure, may be used (see US Published Patent Application 2017/0063613 of Bloch et al, the disclosure of which has been incorporated herein by reference, for a more detailed discussion).

In the system of FIG. 2, an aggregation/root node 235 ultimately receives all of the vectors 220 and produces a single combined vector 240.

Figure 3B:
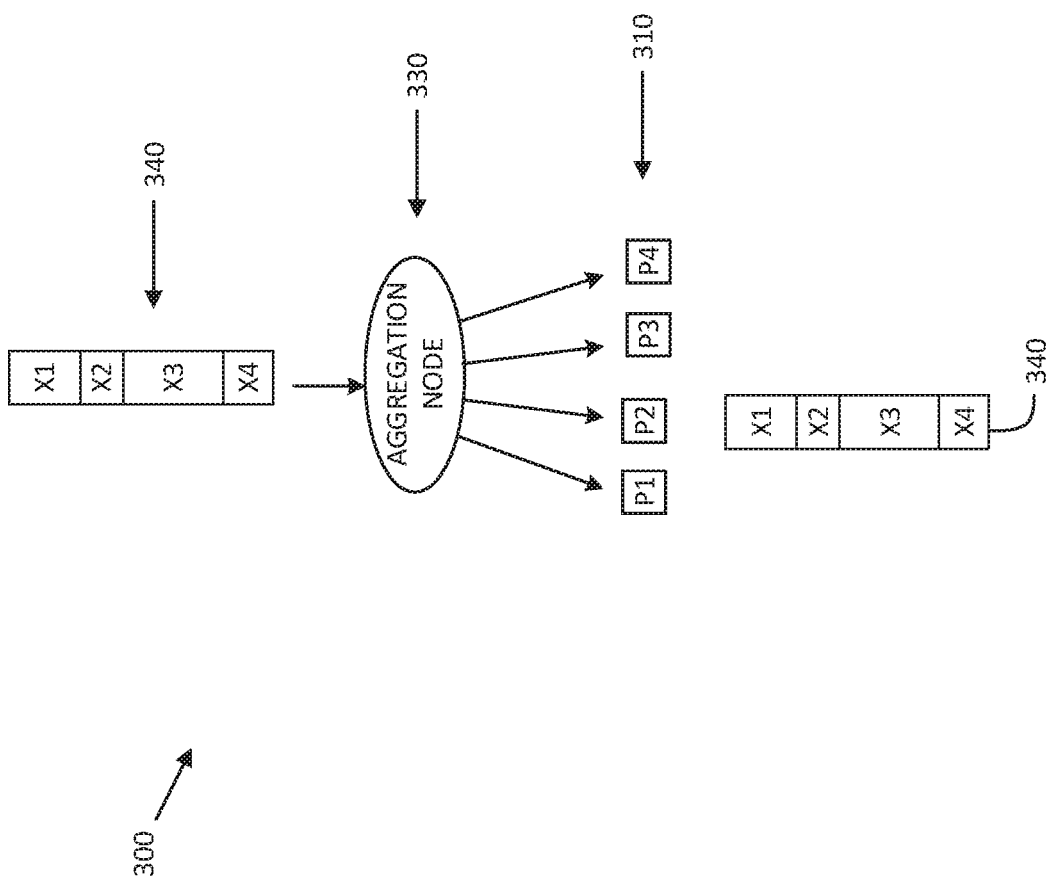
FIG. 3B is a simplified pictorial illustration showing distribution of data, in a system similar to that of FIG. 1, to a single process.

Reference is now made to FIG. 3A, which is a simplified pictorial illustration showing distribution of data, in a system similar to that of FIG. 1, to all processes; and to FIG. 3B, which is a simplified pictorial illustration showing distribution of data, in a system similar to that of FIG. 1, to a single process.

FIGS. 3A and 3B show a system, generally designated 300, which operates similarly to the system 100 of FIG. 1. For purposes of simplicity of illustration, the systems of FIGS. 3A and 3B are based on the system of FIG. 1, it being appreciated that systems based on the system of FIG. 2 may alternatively be used.

In FIGS. 3A and 3B, the systems are shown after the processes 310 have already sent their individual vectors (not shown) to the aggregation node 330, and the combined vector 340 has been produced. In FIG. 3A, a situation is depicted in which the combined vector 340 is sent to all of the processes 310 (as would be the case, by way of non-limiting example, in an all-gather operation); while in FIG. 3B, a situation is depicted in which the combined vector 340 is sent to only one of the processes 310 (as would be the case, by way of non-limiting example, in a gather operation).

In FIGS. 3A and 3B, inter alia, input data is depicted as being provided in order (X1, 2, X3, X4). While providing input data in order may be optimal in certain preferred embodiments, it is appreciated that it is not necessary to provide input data in order.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for computation, comprising:
   in a high-performance computing system that runs an application in which multiple processes perform portions of work of the application, defining a network comprising the multiple processes and at least one aggregation node;
   in response to a data movement command, passing respective vectors of data having different, respective data sizes from the multiple processes over the network to the at least one aggregation node;
   at the at least one aggregation node, in response to the data movement command, receiving and concatenating the respective vectors to generate a result vector having a result vector size equal to a sum of the respective data sizes of the received vectors; and
   outputting the result vector from the at least one aggregation node to the network,
   wherein defining the network comprises providing multiple aggregation nodes, comprising a root node, which outputs the result vector, and at least two intermediate aggregation nodes, each of which receives and concatenates the respective vectors from respective ones of the processes.

2. The method according to claim 1, wherein the data movement command comprises a gather command.

3. The method according to claim 1, wherein outputting the result vector comprises sending the result vector to the multiple processes.

4. The method according to claim 1, wherein defining the network comprises providing a hierarchical tree having nodes corresponding to the multiple processes.

5. The method according to claim 1, wherein passing the respective vectors comprises sending the data from the multiple processes with respective indexes, and wherein concatenating the respective vectors comprises adding the data to the result vector according to the respective indexes.

6. The method according to claim 5, wherein sending the data comprises providing indications from the multiple processes to the at least one aggregation node of the respective data sizes of the respective vectors.

7. A high-performance computing system comprising multiple nodes, which are configured to run an application in which multiple processes perform portions of work of the application,
   wherein a network comprising the multiple processes and at least one aggregation node is defined in the system, such that in response to a data movement command, the multiple processes pass respective vectors of data having different, respective data sizes over the network to the at least one aggregation node, and wherein at the at least one aggregation node, in response to the data movement command, receives and concatenates the respective vectors to generate and outputs a result vector to the network having a result vector size equal to a sum of the respective data sizes of the received vectors, wherein the network comprises multiple aggregation nodes, including a root node, which outputs the result vector, and at least two intermediate aggregation nodes, each of which receives and concatenates the respective vectors from respective ones of the processes.

8. The system according to claim 7, wherein the data movement command comprises a gather command.

9. The system according to claim 7, wherein the at least one aggregation node is configured to send the result vector to the multiple processes.

10. The system according to claim 7, wherein the network comprises is defined as a hierarchical tree in which the nodes correspond to the multiple processes.

11. The system according to claim 7, wherein the multiple processes pass the respective vectors to the at least one aggregation node together with respective indexes, and wherein the at least one aggregation node concatenates the respective vectors according to the respective indexes.

12. The system according to claim 11, wherein the multiple processes provide indications to the at least one aggregation node of the respective data sizes of the respective vectors.

* * * * *